United States Patent
Liu et al.

(10) Patent No.: US 11,963,223 B2
(45) Date of Patent: Apr. 16, 2024

(54) TECHNIQUE FOR RANDOM ACCESS ON AN UNLICENSED CHANNEL

(71) Applicant: Telefonaktiebolaget LM Ericsson (publ), Stockholm (SE)

(72) Inventors: Jinhua Liu, Beijing (CN); Min Wang, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 447 days.

(21) Appl. No.: 17/290,138

(22) PCT Filed: Oct. 29, 2019

(86) PCT No.: PCT/EP2019/079454
§ 371 (c)(1),
(2) Date: Apr. 29, 2021

(87) PCT Pub. No.: WO2020/089193
PCT Pub. Date: May 7, 2020

(65) Prior Publication Data
US 2021/0400724 A1 Dec. 23, 2021

(30) Foreign Application Priority Data
Oct. 30, 2018 (WO) ............... PCT/CN2018/112530

(51) Int. Cl.
*H04W 74/08* (2009.01)
*H04W 24/08* (2009.01)
(Continued)

(52) U.S. Cl.
CPC ....... *H04W 74/0816* (2013.01); *H04W 24/08* (2013.01); *H04W 36/08* (2013.01); *H04W 74/0841* (2013.01)

(58) Field of Classification Search
None
See application file for complete search history.

(56) References Cited

U.S. PATENT DOCUMENTS

2019/0246428 A1 8/2019 Yoon et al.
2020/0100296 A1* 3/2020 Roy ............... H04W 72/56
(Continued)

FOREIGN PATENT DOCUMENTS

WO 2017078602 A1 5/2017
WO 2018066882 A1 4/2018

OTHER PUBLICATIONS

International Search Report and Written Opinion issued in International Application No. PCT/EP2019/079454 dated Jan. 21, 2020 (11 pages).

(Continued)

*Primary Examiner* — Anh Ngoc M Nguyen
(74) *Attorney, Agent, or Firm* — Rothwell, Figg, Ernst & Manbeck, P.C.

(57) ABSTRACT

A technique for performing or providing random access, RA, to a radio access network using an unlicensed channel (400) is described. As to a method aspect of the technique, a first listen-before-talk (LBT) operation on the unlicensed channel is performed. The first LBT operation indicates that the channel is occupied at a beginning (412) of a RA resource (410) for transmitting a RA message signal (304). A second LBT operation on the unlicensed channel (400) indicates that the channel (400) is idle within a part (414) of the RA resource (410) for transmitting the RA message signal (304). The RA message signal (304) is transmitted in response to the second LBT operation.

23 Claims, 8 Drawing Sheets

(51) Int. Cl.
*H04W 36/08* (2009.01)
*H04W 74/0816* (2024.01)
*H04W 74/0833* (2024.01)

(56) References Cited

U.S. PATENT DOCUMENTS

2020/0163128 A1\* 5/2020 Pang ................. H04W 72/0453
2020/0196354 A1\* 6/2020 Li ..................... H04W 74/0833

OTHER PUBLICATIONS

International Preliminary Report on Patentability (IPRP) issued in International Application No. PCT/EP2019/079454 dated Sep. 28, 2020 (19 pages).
3GPP TS 38.211 V15.3.0 (Sep. 2018) (96 pages).Physical channels and modulation (Release 15).

\* cited by examiner

TECHNIQUE FOR RANDOM ACCESS ON AN UNLICENSED CHANNEL

CROSS REFERENCE TO RELATED APPLICATIONS

This application is a 35 U.S.C. § 371 National Stage of International Patent Application No. PCT/EP2019/079454, filed Oct. 29, 2019, designating the United States, which claims priority to International Patent Application No. PCT/CN2018/112530, filed Oct. 30, 2018. The above identified applications are incorporated by this reference.

TECHNICAL FIELD

The present disclosure generally relates to a technique for random access on an unlicensed carrier. More specifically, a method and a device are provided for performing or providing random access to a radio access network using an unlicensed channel.

BACKGROUND

Next generation or fifth generation telecommunications systems, abbreviated by 5G or NR systems, are specified by the Third Generation Partnership Project (3GPP) and expected to support a wide range of use cases with varying requirements ranging from fully mobile devices to stationary IoT or fixed wireless broadband devices. Herein, such devices are collectively referred to as radio devices or user equipment (UE).

The data traffic pattern associated with many NR use cases is expected to comprise short or long bursts of data traffic with a varying length of a waiting period in between. Such a period may be referred to as an inactive state. In NR systems, both license-assisted access (NR-LAA) and stand-alone unlicensed operation (NR-U) are to be supported according to 3GPP.

For the stand-alone operation of unlicensed spectrum, a random access (RA) procedure is performed on an unlicensed channel or carrier. Accordingly, the radio device and an access node have to sense the carrier upon a transmission on the physical RA channel (PRACH) and subsequent message transmissions, respectively. Prior to the PRACH transmission, the radio device performs channel sensing (e.g., a listen-before talk, LBT, procedure) to determine whether the at least one channel intended for the transmission is idle or not. If the at least one intended channel for the RA is determined to be available upon start of a PRACH transmission occasion (RA occasion), a PRACH transmission is initiated by the radio device. The radio device needs to transmit the PRACH preamble during the whole RA occasion.

According to such procedure, the radio device can transmit a PRACH preamble only if the one or more channels for the PRACH transmission are available upon the start of a RA occasion. If the one or more channels are not available prior to the RA occasion, the radio device has to wait for the next RA occasion and perform channel sensing (e.g., the LBT procedure) again to determine if the intended channel is available or not.

However, such delay in the RA procedure is sensitive for a (e.g., stand-alone) unlicensed operation of a radio access network. For example, the delay may significantly add to a latency of the data traffic.

SUMMARY

Accordingly, there is a need for a radio communication technique that enhances random access on an unlicensed channel.

As to a method aspect, a method of performing or providing random access (RA) to a radio access network (RAN) using an unlicensed channel is provided. The method comprises or initiates a step of performing a first listen-before-talk (LBT) operation on the unlicensed channel, the first LBT operation indicating the channel being occupied at a beginning of a RA resource for transmitting a RA message signal. The method further comprises or initiates a step of performing a second LBT operation on the unlicensed channel, the second LBT operation indicating the channel being idle within a part (e.g., at the end) of the RA resource for transmitting the RA message signal. The method may further comprise or initiate a step of transmitting the RA message signal in response to the second LBT operation.

By transmitting the RA message in response to the successful second LBT operation, the RA message can be transmitted at an earlier RA resource and/or without performing a further LBT procedure for a further RA resource in at least some embodiments. For example, a RA procedure may be performed earlier and/or may be completed faster. A delay or a latency caused by the RA on the unlicensed channel can be reduced or avoided. The embodiments can address the conventional PRACH delay issue in the stand-alone unlicensed operation of 3GPP New Radio (NR) and/or 3GPP Long Term Evolution (LTE).

Alternatively or in combination, by transmitting the RA message in response to the successful second LBT operation, same or further embodiments can increase a temporal diversity of the transmission of the RA message. For example, a (e.g., partial) RA message transmitted in the idle part of the RA resource may be soft-combined with a previous and/or later transmission of the RA message. The transmission in the idle part can, thus, increase a signal to noise and/or interference ratio and/or reduce a rate of failed transmissions of the RA message.

The RA message signal transmitted in response to the second LBT operation may be referred to as a partial RA message and/or a fractional RA message. Alternatively or in addition, the part of the RA resource, during which the channel is idle according to the second LBT operation and/or the part of the RA resource used for transmitting the RA message signal in response to the second LBT operation may be referred to as a partial RA resource (e.g., a fractional RA resource) and/or a partial PRACH (e.g., a fractional PRACH) and/or partial RA occasion (e.g., a fractional RA occasion).

Alternatively or in addition, the RA message signal transmitted in response to the second LBT operation may obey a partial RA format (e.g., a fraction RA format).

The technique may be implemented to avoid that the RA transmission (e.g., the transmission of the RA message signal) is blocked by another RA transmission (e.g., as identified in the 3GPP document R1-1905785, "Feature lead summery on initial access signals and channels for NR-U", particularly in Sect. 3.2.5, "LBT Gaps between RACH occasions") and/or is blocked by a PUSCH transmission or a PUCCH transmission (e.g., as identified in the 3GPP document R1-1905785, "Feature lead summery on initial access signals and channels for NR-U", particularly in Sect. 3.2.6, "Multiplexing PRACH and other channels").

Alternatively or in addition, the technique may be implemented according to the 3GPP document R1-1907451, "Initial access signals and channels", e.g. according to Proposal 7.

Embodiments can transmit the RA message signal on the channel when the channel becomes idle within the period of the RA resource and/or at the end of the period of the RA resource. Transmitting at least a part of the RA message in the idle part of the RA resource and/or transmitting the (e.g., complete) RA message in an additional RA resource directly after the RA resource can improve at least one of signal gain and latency. This may be particularly efficient for transmitting a RA preamble as the RA message in a RA occasion (e.g., a PRACH transmission occasion) as the RA resource, which may span multiple subframes in the time domain.

In contrast, a conventional RA procedure, the radio device cannot start a new LBT operation and occupy the remaining period (i.e., the idle part) of the RA occasion. Embodiments overcome this restriction and, thus, enhance at least one of signal gain and latency for the PRACH transmission or any other RA message transmission in the unlicensed spectrum. The technique may be implemented as an enhancement of any RA transmission on an unlicensed channel, particularly any RA channel (RACH) or physical RACH (PRACH) transmission on an unlicensed channel.

The method of performing RA to the RAN may be performed by a radio device, e.g., a user equipment (UE) according to the Third Generation Partnership Project (3GPP). The radio device may be configured for performing the RA to the RAN.

Alternatively or in addition, the method of providing RA to the RAN may be performed by the RAN, e.g., each of at least one access node of the RAN. The access node may be configured to provide (e.g., enable) RA to the RAN. The access node may be a base station, e.g., a 3GPP NR or next generation Node B (abbreviated by gNodeB or gNB).

The RA resource (e.g., a RA occasion and/or a RA response window) or any radio resource of the RAN may be temporarily structured. The temporal structure may comprise radio frames, subframes, slots and/or symbols. The temporal structure may be defined by synchronization signals of the RAN, e.g., synchronization signals broadcasted from the access node.

The unlicensed channel may be a radio channel using unlicensed spectrum and/or shared spectrum. The unlicensed channel may be a shared channel, e.g., by radio devices accessing the RAN or other radio devices.

The first LBT operation indicating that the channel is occupied may indicate that the channel is not idle and/or unavailable. The second LBT operation indicating that the channel is idle may indicate that the channel is unoccupied and/or available (e.g., including sensing the channel for a defer duration).

The RA resource (e.g., a RA occasion or any radio resource for the RA) may be defined in terms of a number of subframes, slots and/or orthogonal frequency division multiplexing (OFDM) symbols. The RA message signal (e.g., any of the 4 messages of a RA procedure) or any radio signal in the RAN may be structured in the time domain in terms of subframes, slots and/or OFDM symbols.

The first LBT operation and the second LBT operation may relate to the same LBT procedure. The first LBT operation and the second LBT operation may be implemented as a single LBT procedure or a continuous LBT procedure. E.g., different steps of one LBT process may implement the first LBT operation and the second LBT operation, respectively. The second LBT operation may be a continuation of the first LBT operation. A backoff counter of the first LBT operation may also be used by the second LBT operation. For example, the backoff counter is not initialized, not reset and/or not randomized at the beginning of the second LBT operation. Alternatively or in addition, a backoff counter of the first LBT operation may define the backoff counter of the second LBT operation. For example, the backoff counter resulting from the first LBT operation may be used as an initial value for the second LBT operation.

Alternatively, the first LBT operation and the second LBT operation may relate to different and/or independent first and second LBT procedures, respectively. For example, a backoff counter of the first LBT operation and a backoff counter of the second LBT operation may be initialized at the beginning of the first and second LBT procedures, respectively. The backoff counter of the second LBT operation may be initialized after the beginning of the RA resource and before the idle part of the RA resource.

The unlicensed channel may be an unlicensed carrier, e.g., in the range of 5 GHz or 6 GHz or higher carrier frequencies. Optionally, the unlicensed channel may be further specified in terms of time slots and/or spatial streams.

The technique may be implemented at one or more radio devices and/or at the RAN serving the one or more radio devices. The method may be performed by the radio device or by an access node of the RAN. The access node may correspond to at least one base station and/or at least one cell of the RAN. The base station may encompass any station that is configured to provide radio access to the radio device. The base station or cell of the RAN may serve a plurality of radio devices, e.g., each implementing the technique.

The radio device may be configured for peer-to-peer communication (e.g., on a sidelink) and/or for accessing the RAN (e.g. on an uplink and/or a downlink). The radio device may be a user equipment (UE, e.g., a 3GPP UE), a mobile or portable station (STA, e.g. a Wi-Fi STA), a device for machine-type communication (MTC), a device for narrowband Internet of Things (NB-IoT) or a combination thereof. Examples for the UE and the mobile station include a mobile phone and a tablet computer. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in household appliances and consumer electronics. Examples for the combination include a self-driving vehicle, a door intercommunication system and an automated teller machine.

Examples for the access node may include a 3G base station or Node B, 4G base station or eNodeB, a 5G base station or gNodeB, an access point (e.g., a Wi-Fi access point) and a network controller (e.g., according to Bluetooth, ZigBee or Z-Wave). The RAN may be implemented according to the Global System for Mobile Communications (GSM), the Universal Mobile Telecommunications System (UMTS), Long Term Evolution (LTE) and/or New Radio (NR).

The technique may be implemented on a Physical (PHY) layer and/or a Medium Access Control (MAC) layer of a protocol stack at the radio device and/or the access node. The technique may be implemented on a Radio Link Control (RLC) layer and/or a Radio Resource Control (RRC) layer of the protocol stack, e.g., by initiating the corresponding steps on the PHY layer and/or the MAC layer.

The RA message signal may be at least partly transmitted within the RA resource. The RA message signal may comprise at least one of a partial RA message and a complete RA message.

The RA message may comprise at least one of a RA preamble (i.e., Msg1, e.g., a physical random access channel, PRACH, preamble), a RA response (i.e., Msg2, e.g., a physical downlink control channel PDCCH message), a radio resource control (RRC) connection request (i.e., Msg3, e.g., a medium access control, MAC, control element) and an RRC connection setup message or a contention resolution message (i.e., Msg4, e.g., a MAC control element).

The transmitted RA message signal may comprise a partial RA message transmitted in the idle part of the RA resource. A duration of the idle part of the RA resource may be less than a duration of the complete RA message. For example, no RA message signal (i.e., no portion of the RA message signal) is transmitted in the occupied part (e.g., in the beginning) of the RA resource.

The RA message signal may be a RA preamble signal. Alternatively or in addition, the RA resource may be a RA occasion. The RA occasion may also be referred to as physical RA channel (PRACH) occasion or PRACH transmission occasion. The RA preamble and the RA preamble signal may also be referred to as PRACH preamble and PRACH preamble signal, respectively.

The RA preamble signal may comprise at least one of a partial RA preamble and a complete RA preamble.

The transmitted RA preamble signal may comprise a partial RA preamble transmitted in the idle part of the RA occasion. A duration of the idle part of the RA occasion may be less than a duration of the complete RA preamble. For example, no RA preamble signal (i.e., no portion of the RA preamble signal) is transmitted in the occupied part of the RA occasion.

The partial RA message may be the partial RA preamble.

The RA preamble signal may comprise orthogonal frequency division multiplexing (OFDM) symbols. The partial RA preamble may comprise a subset of the OFDM symbols configured in the RAN for a complete RA preamble.

The subset may be a proper subset. The subset may comprise all OFDM symbols except one or more first OFDM symbols of the complete RA message. In other words, the RA message may be "partial" by abandoning (e.g., not transmitting) one or more of the OFDM symbols at the beginning of the complete RA message.

Each of the OFDM symbols in the subset may be temporally allocated in the RA occasion in accordance with an allocation of the respective OFDM symbol of the complete RA preamble.

The complete RA message may be the complete RA preamble.

The method may further comprise or initiate a step of monitoring an RA response window for reception of an RA response to the transmission of the partial RA preamble. The RAR may be transmitted from the RAN, e.g., from the access node of the RAN. The RA response (RAR) window may be temporarily defined relative to the RA occasion.

The method may be repeated in the absence of the RA response in the RA response window. A transmission power for the repeated transmission of the RA preamble signal may be equal to a transmission power for the previous transmission of the RA preamble signal.

Repeating the method may be implemented by repeating at least the first and second LBT operations and the transmission of the RA preamble signal may be repeated. The latter step may also be referred to as the repeated transmission of the RA preamble signal.

A transmission of the partial RA preamble without reception of an associated RA response may also be referred to as a failed transmission of the partial RA preamble. A transmission of the partial RA preamble followed by reception of an associated RA response may also be referred to as a successful transmission of the partial RA preamble.

The transmission power used for the repeated transmission of the RA preamble signal may be equal to or greater than a transmission power used for the previous transmission of the RA preamble signal, e.g., depending on a configuration. The increase in the transmission power between successive RA preamble signals may be controlled by a transmission counter. The transmission counter may be selectively increased in the absence of a RA response to the transmission of the partial RA preamble depending on the configuration.

The transmission power used for the repeated transmission may be equal to the transmission power used for transmitting the partial RA preamble, since a level for the transmission power may be defined base on the diversity gain of the complete RA preamble. For example, increasing the transmit power responsive to the absence of a RA response to the transmission of the partial RA preamble may result in a level for the transmission power that is higher than necessary for a RA based on the complete RA preamble.

The partial RA preamble may be selectively transmitted in the idle part of the RA occasion, if (e.g., only if) a duration of the idle part of the RA occasion is greater than a threshold.

The threshold may comprise an absolute time duration or a relative ratio between a duration of the idle part of the RA occasion and a duration of the RA occasion (or between a duration of the idle part of the RA occasion and a duration of the complete RA preamble). Alternatively or in addition, the threshold may be defined in terms of a number of subframes, slots and/or OFDM symbols.

For example, the partial RA preamble may be transmitted in the idle part of the RA occasion, only if a duration of the idle part of the RA occasion is greater than the threshold. If the duration of the idle part of the RA occasion is less than the threshold, the radio device may refrain from transmitting any RA preamble signal in the RA occasion.

A transmission power for the transmission of the partial RA preamble may be inversely related to at least one of the threshold and the duration of the idle part of the RA occasion.

The inverse relation may be implemented by a (e.g., strictly) monotonically decreasing function. For example, the transmission power for the transmission of the RA preamble may be inversely proportional to the threshold and/or the duration of the idle part of the RA occasion. An energy of the partial RA preamble may correspond to an energy of the complete RA preamble.

The method may further comprise or initiate a step of transmitting a capability indicator indicative of support of the transmission of the partial RA preamble. The capability indicator may be indicative of whether or not the radio device (e.g., the UE) is capable of the transmission of the partial RA preamble. The capability indicator may also be referred to as UE capability indicator. The capability indicator may be transmitted from the radio device to the RAN (e.g., the access node) when a radio connection setup is finished for the radio device.

The method may further comprise or initiate a step of receiving a configuration information indicative of at least one of (i) whether the RAN supports a reception of the partial RA preamble;
(ii) a value of the threshold;
(iii) one or more candidate start positions for the transmission (206) of the partial RA preamble within the RA occasion; and
(iv) one or more formats of RA preambles to be used for the transmission of the partial RA preamble.

The configuration information may be received from the RAN, e.g., from the access node of the RAN. The access node may be the access node serving the radio device among a plurality of access nodes of the RAN.

The configuration information may be broadcast in the RAN, e.g., using a master information block (MIB) or a system information block (SIB). Alternatively or in addition, the configuration information may be received using dedicated signaling, e.g., radio resource control (RRC) signaling.

The configuration information may indicate whether the RAN supports a reception of the partial RA preamble by indicating whether the access node supports a reception of the partial RA preamble.

The candidate start position indicated by the configuration information may be UE-specific.

The one or more formats of RA preambles to be used may specify complete RA preambles. The transmitted partial RA preamble may be a part of the complete RA preamble specified by the used format.

The method may further comprise or initiate a step of transmitting a measurement report indicative of a number of transmissions of the partial RA preamble without reception of an associated RA response.

The measurement report may be based on the transmission counter counting the number of failed transmissions of the partial RA preamble.

The configuration information may be at least one of received responsive to and dependent on the measurement report.

A radio device configured for performing the RA to the RAN may perform the method.

The RAN may comprise a plurality of access nodes including a source access node, which is currently serving the radio device, and a target access node for a handover of the radio device from the source access node to the target access node. The method may further comprise or initiate a step of receiving a handover command indicative of whether the target access node supports a reception of the partial RA preamble. The handover command may be received from the source access node. The handover command may be a RRC signal.

A first format for a complete RA preamble and a second format for a complete RA preamble may be supported by the RAN. A duration of the complete RA preamble according to the second format may be shorter than a duration of the complete RA preamble according to the first format.

The RAN may transmit configuration information that is indicative of the supported first and second formats. The RAN may configure the radio device with (i.e., control the radio device for using) the first format and/or the second format by broadcasting or dedicatedly signaling the configuration information indicative of the first format and/or the second format, e.g., from the access node.

The transmission of the RA preamble signal within the RA occasion may uses the second format in response to the second LBT operation. Alternatively or in addition, the UE may switch from using the first format to using the second format during the RA occasion in response to the second LBT operation.

The transmitted RA preamble signal may comprise the complete RA preamble according to the second format within the RA occasion.

The second format may be used in response to the second LBT operation, e.g., if at least one of the following criteria is fulfilled. A first criterion comprises a duration of the idle part of the RA occasion being shorter than the duration of the complete RA preamble according to the first format. A second criterion comprises a duration of the idle part of the RA occasion being equal or longer than the duration of the complete RA preamble according to the second format.

An additional RA occasion may be configured in the RAN, e.g., directly after the RA occasion. The RA preamble signal may be at least partly, e.g., completely, transmitted within the additional RA occasion. The additional RA occasion may be consecutive, contiguous and/or neighboring in time after the RA occasion. For example, the additional RA occasion may occupy a next subframe, slot or OFDM symbol following the RA occasion.

Different formats for the RA preamble may be configured in and/or by the RAN for the RA occasion and the additional RA occasion, respectively. For example, the (e.g., short) second format may be used in the RA occasion and the (e.g., long) first format may be used in the addition RA occasion.

The method may further comprise or initiate a step of performing a third LBT operation on the unlicensed channel. The third LBT operation may be indicative of the channel being idle in the additional RA occasion.

The first LBT operation and/or the second LBT operation may be part of one LBT procedure.

In one variant, the third LBT operation may be an additional LBT procedure or may be part of the additional LBT procedure. The additional LBT procedure may be independent of the one LBT procedure comprising or implementing the first LBT operation and/or the second LBT operation.

In another variant, the third LBT operation may be a continuation of the one LBT procedure, e.g., a continuation of the second LBT operation. The one LBT procedure may be continued if the idle part of the RA occasion is not used for the transmission of the RA preamble signal. For example, the second LBT operation may be indicative of the idle part of the RA occasion and the radio device may refrain from transmitting in the idle part, e.g., because the duration of the idle part is less than the threshold.

The RA preamble signal may comprise a complete RA preamble transmitted in the additional RA occasion. Alternatively or in addition, the RA preamble signal may comprise a partial RA preamble in the RA occasion.

The transmission of the RA preamble signal may start in the additional RA occasion.

The RA message signal may be a RA response signal. The RA resource may be a scheduled transmission duration for the RA response signal. The scheduled transmission duration for the RA response signal may be or comprise a RA response window. The RAN may broadcast a duration of the RAR window in a system information block, e.g., SIB2.

The partial RA response may result from puncturing a complete RA response, e.g., comprising redundant bits.

The RA message may be "partial" by performing rate matching or by puncturing a protocol data unit (PDU) given or built by a higher layer (e.g., a layer higher than the layer performing the method), e.g., a medium access control (MAC) PDU.

Embodiments can allow a UE to send a partial PRACH preamble if the intended one or more channels for the PRACH preamble transmission is determined to be idle within a part of the period of a PRACH transmission occasion x. Via transmitting a partial PRACH preamble, the UE can better secure the intended one or more channels for PRACH transmission. Same or further embodiments can allow a UE to change its preamble format. For example, a shorter PRACH preamble may be used if possible within the period of a PRACH transmission occasion. In same or yet another embodiment, additional PRACH occasions may be configured directly after the PRACH occasion which is subject to the LBT failures. In one variant, the UE may perform an LBT operation aiming at occupying OFDM symbols during the previous PRACH occasion x in which the UE has detected LBT failures. In another variant, the UE may perform an LBT operation aiming at occupying OFDM symbols at the beginning of the additional RA occasions.

For example in order to reduce the latency due to LBT subjection, the additional RA occasions may have different formats and/or transmission periods associated with different PRACH preamble formats. In this way, the access node (e.g., a gNB) may configure the radio device (e.g., a UE) with multiple PRACH preamble formats, e.g., associated with RA occasions with different transmission durations. For a cell configured with additional RA occasions, the access node (e.g., the gNB) may configure the cell with multiple prach-ConfigurationIndex, wherein each index is associated with a specific PRACH preamble format.

The additional RA occasion may be available to use for transmission by the radio device or in the cell. The availability may be controlled by the access node (e.g., the gNB) configuring when the additional RA occasions are available via signalling. Alternatively or in addition, the availability may be controlled by the radio device (e.g., the UE) having experienced LBT failures for a number of consecutive RA occasions.

The technique may be applied to or compatible with 3GPP NR unlicensed spectrum (NR-U) and/or 3GPP NR standalone scenarios. The technique may be implemented for RA on an unlicensed channel (e.g., an unlicensed carrier).

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download in a data network, e.g., through the RAN and/or in the Internet. Alternatively or in addition, the method may be encoded in a Field-Programmable Gate Array (FPGA) and/or an Application-Specific Integrated Circuit (ASIC), or the functionality may be provided for download by means of a hardware description language.

As to a device aspect, a device for performing or providing RA to a RAN using an unlicensed channel is provided. The device is configured to perform the method aspect. Alternatively or in addition, the device may comprise units or modules configured to perform respective steps of the method aspect.

As to a further device aspect, a device for performing or providing RA to a RAN using an unlicensed channel is provided. The device comprises at least one processor and a memory. Said memory may comprise instructions executable by said at least one processor whereby the device is operative to perform the method aspect.

As to a still further aspect, a user equipment (UE) configured to communicate with an access node (e.g., a base station) is provided. The UE comprises a radio interface and processing circuitry configured to execute any one of the steps of the method aspect, particularly the method of performing RA to a RAN using an unlicensed channel.

As to a still further aspect, an access node (e.g., a base station) configured to communicate with one or more UEs is provided. The access node comprises a radio interface and processing circuitry configured to execute any one of the steps of the method aspect, particularly the method of providing RA to a RAN using an unlicensed channel.

As to a still further aspect, a communication system including a host computer is provided. The host computer may comprise a processing circuitry configured to provide user data. The host computer may further comprise a communication interface configured to forward the user data to a RAN (e.g., a cellular network) for transmission to a UE, wherein the UE comprises a radio interface and processing circuitry. The RAN and/or the processing circuitry of the UE is configured to execute any one of the steps of the method aspect.

The communication system may further include the UE. Alternatively or in addition, the cellular network may further include a base station configured to communicate with the UE.

The processing circuitry of the host computer may be configured to execute a host application, thereby providing the user data. Alternatively or in addition, the processing circuitry of the UE may be configured to execute a client application associated with the host application.

As to a still further aspect, a method implemented in a user equipment (UE) is provided. The method may comprise any of the steps of the method aspect, particularly the method of performing RA to a RAN using an unlicensed channel.

As to a still further aspect, a method implemented in an access node is provided. The method may comprise any of the steps of the method aspect, particularly the method of providing RA to a RAN using an unlicensed channel.

Any of the devices, the UE, the access node, the system or any node or station for embodying the technique may further include any feature disclosed in the context of the method aspect, and vice versa. Particularly, any one of the units and modules, or a dedicated unit or module, may be configured to perform or trigger one or more of the steps of any one of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented in any other radio network, including 3GPP LTE or a successor thereof, Wireless Local Area Network (WLAN) according to the standard family IEEE 802.11, Bluetooth according to the Bluetooth Special Interest Group (SIG), particularly Bluetooth Low Energy and Bluetooth broadcasting, and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
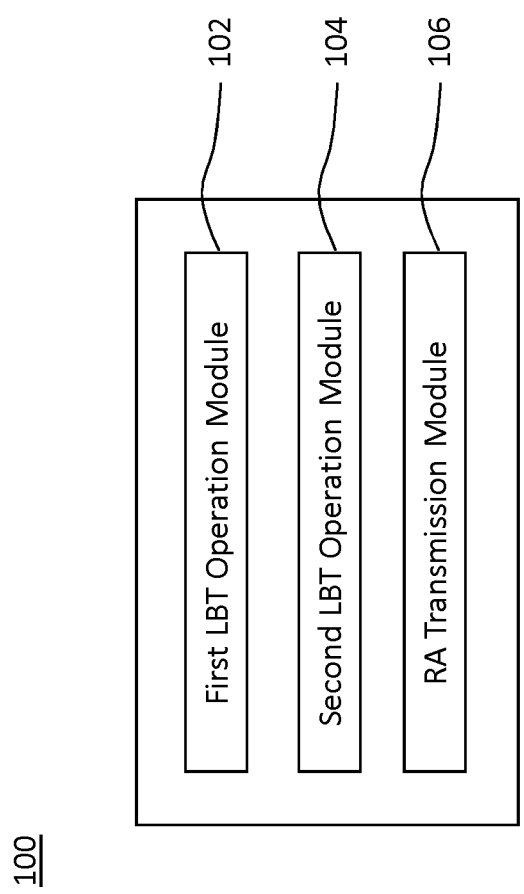
FIG. 1 shows a schematic block diagram of a device embodiment for performing or providing random access to a radio access network using an unlicensed channel.

FIG. 1 schematically illustrates a block diagram of a device for performing or providing random access (RA) to a radio access network (RAN) using an unlicensed channel. The device is generically referred to by reference sign 100.

The device 100 comprises a first listen-before-talk (LBT) module 102 that performs a first LBT operation on the unlicensed channel. The first LBT operation results in indicating that the channel is occupied at a beginning of a RA resource. The RA resource may encompass a period for transmitting a RA message signal in the RAN. The device 100 further comprises a second LBT module 104 that performs a second LBT operation on the unlicensed channel. The second LBT operation results in indicating that the channel is idle within a part of the RA resource for transmitting the RA message signal. For example, the channel may be idle after the beginning of the RA resource and/or at the end of the RA resource. The device 100 further comprises an RA transmission module 106 that transmits the RA message signal in response to the second LBT operation, e.g. in the idle part of the RA resource (e.g., if the second LBT operation is indicating that the channel is idle before the end of the RA resource) and/or in an additional RA resource directly following the RA resource (e.g., if the second LBT operation is indicating that the channel is idle at the end of the RA resource).

Any of the modules of the device 100 may be implemented by units configured to provide the corresponding functionality.

In one aspect, the device 100 may be part of a radio access network (RAN). The device 100 may be embodied by or at an access node (e.g., a base station) of the RAN, nodes connected to the RAN for controlling one or more base stations, or a combination thereof. To this end, the device 100 may embody a method of providing RA.

In another aspect, which is combinable with the one aspect, the device 100 may be wirelessly connected or connectable to a RAN. The device 100 may be embodied by or at a radio device configured for accessing the RAN, for example in a vehicle configured for radio-connected driving. To this end, the device 100 may embody a method of performing RA.

The access node may encompass a network controller (e.g., a Wi-Fi access point) or a cellular access node (e.g. a 3G Node B, a 4G eNodeB or a 5G gNodeB) of the RAN. The access node may be configured to provide radio access.

Alternatively or in addition, the one or more radio devices may include a mobile or portable station or a radio device connectable to the RAN. Each radio device may be a user equipment (UE), a device for machine-type communication (MTC) and/or a device for (e.g., narrowband) Internet of Things (IoT).

Figure 2:
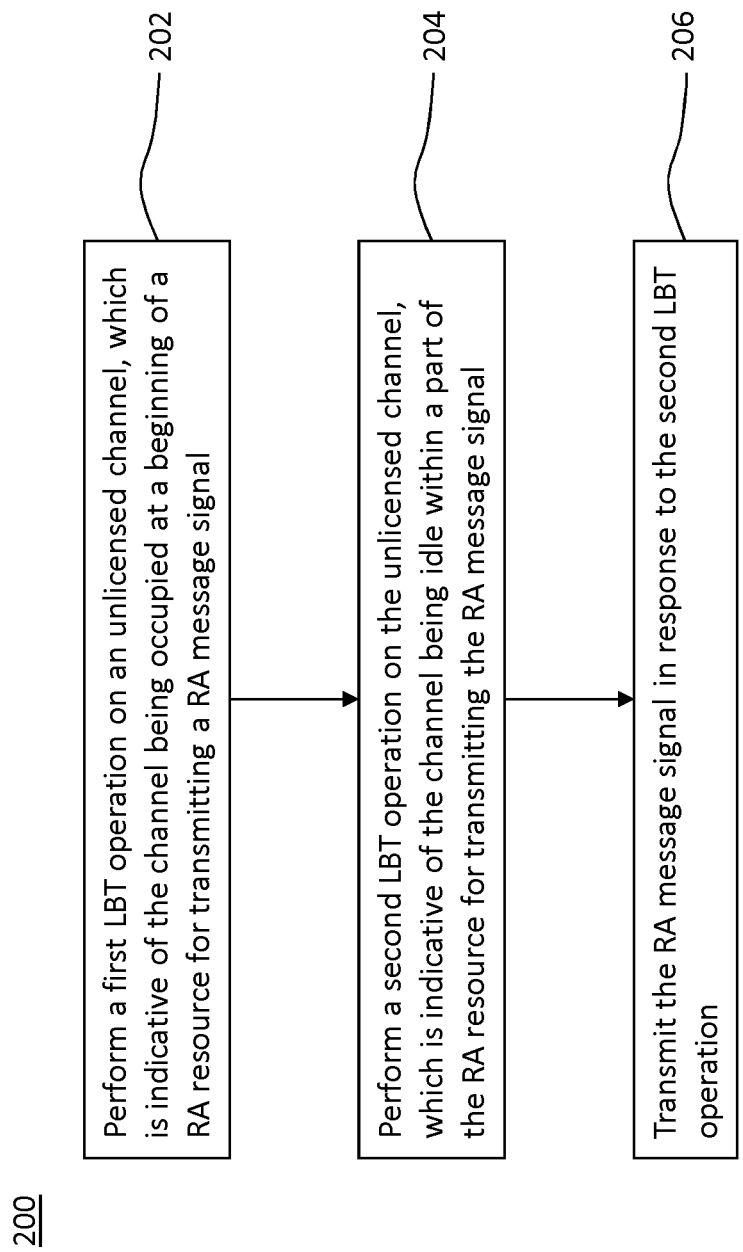
FIG. 2 shows a flowchart for a method embodiment of performing or providing random access to a radio access network using an unlicensed channel, which method is implementable by the device of FIG. 1.

FIG. 2 shows a flowchart for a method 200 of performing and/or providing RA to a RAN using an unlicensed channel. The method 200 comprises or initiates a step 202 of performing a first LBT operation on the unlicensed channel. The first LBT operation indicates the channel being occupied at a beginning of a RA resource for transmitting a RA message signal. The method 200 further comprises or initiates a step 204 of performing a second LBT operation on the unlicensed channel. The second LBT operation indicates the channel being idle within a part of the RA resource for transmitting the RA message signal, e.g., within the RA resource and/or at the end of the RA resource. The method 200 further comprises or initiates a step 206 of transmitting the RA message signal in response to the second LBT operation.

The method 200 may be performed by the device 100, e.g., at or using the radio device for accessing the RAN and/or at the access node for providing RA to the RAN. For example, the modules 102, 104 and 106 may perform the steps 202, 204 and 206, respectively. Embodiments of the device 100 may be configured for stand-alone radio communication.

Figure 3:
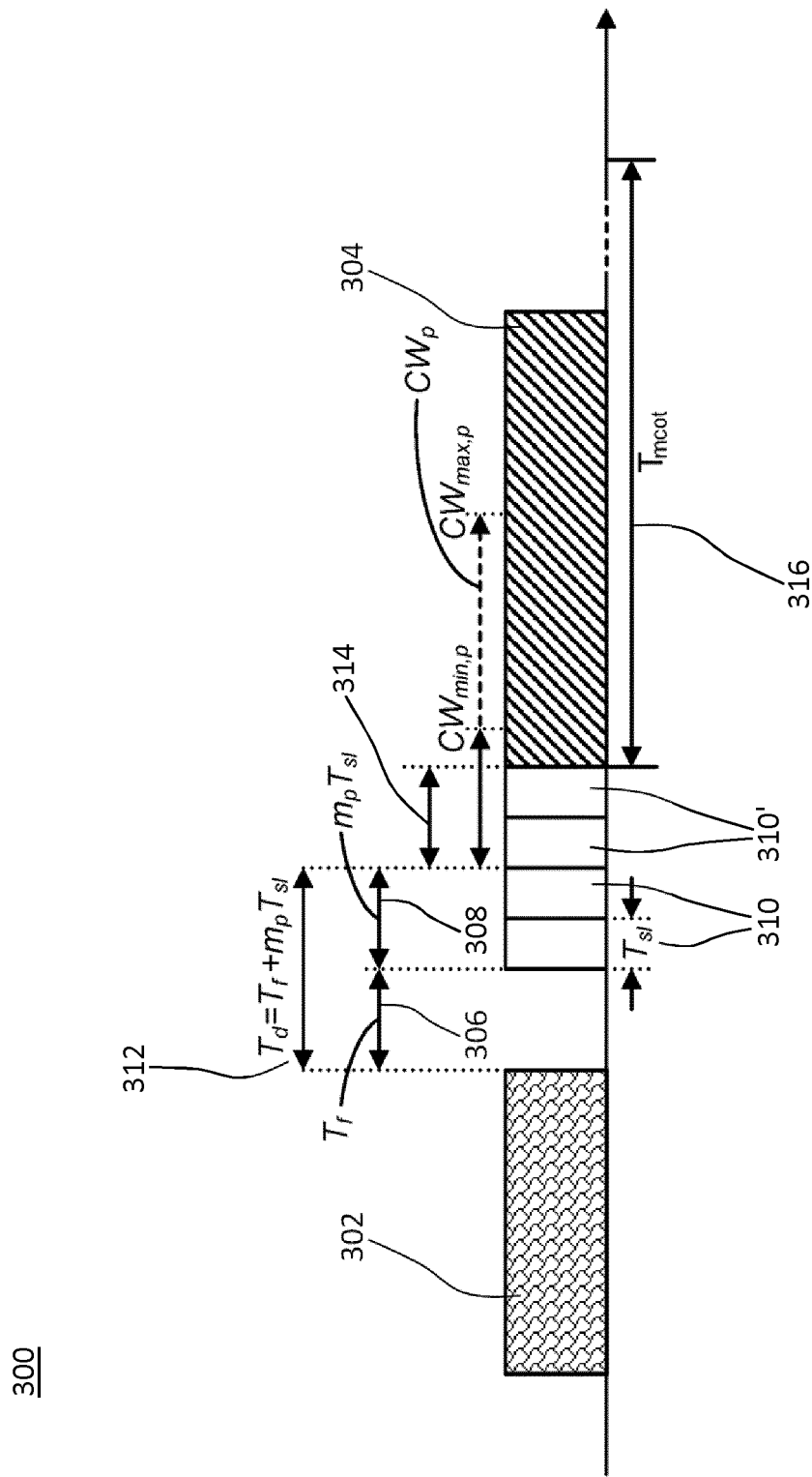
FIG. 3 schematically illustrates an exemplary listen-before-talk procedure in the time domain, which is implementable for the device of FIG. 1 and the method of FIG. 2.

FIG. 3 schematically illustrates an example of the LBT procedure 300 in the time domain. While the example of the LBT procedure 300 is described below for License-Assisted Access (LAA), e.g., according to LTE (LTE-LAA), same or similar steps may be implemented for other radio access technologies, e.g. according to NR-LAA and/or NR-U. In the LTE example of the LBT procedure 300, an evolved NodeB (eNB) is an example for the access node. The unlicensed channel may be a channel used by at least one secondary cell (SCell) for LAA transmissions on the unlicensed channel, e.g., including a physical downlink shared channel (PDSCH).

The device 100 performs the LBT procedure 300 to determine that a previous transmission 302 on the unlicensed channel has ended and the channel is idle for the transmission 206 of the RA message 304 (e.g., the RA preamble).

The device 100 performs the LBT procedure, i.e., the device 100 monitors the unlicensed channel and waits until the unlicensed channel is idle before transmitting the RA message 304 in the step 206. More specifically, as a prerequisite for the transmission 206 of the RA message 304, the device 100 performs channel sensing to determine that the unlicensed channel is idle during slot durations 310, $T_{sl}$, of a defer duration 312, $T_d$.

The defer duration 312, $T_d$, comprises a first channel sensing duration 306, $T_f$, and a second channel sensing duration 308, $m_p \cdot T_{sl}$. The LBT procedure 300 allows access to the unlicensed channel for the transmission 206, if the channel is sensed to be idle for the defer duration 312, $T_d$, and optionally any backoff duration 314. The backoff duration 314 comprises a number of additional slot durations 310', each of which also has the duration $T_{sl}$. The number of additional slot durations 310' in the backoff duration 314 is determined by a backoff counter N. The backoff counter N is specific for the device 100. The backoff counter N is decremented for each additional slot duration 310' that is sensed as clear.

As a specific example, if a gNB or a eNB as the device 100 transmits a discovery signal not involving the PDSCH, when N>0 in the LBT procedure 300, the device 100 does not decrement N during the one or more slot durations overlapping with the transmission of the discovery signal.

An LBT operation indicating that the unlicensed channel is idle may comprise channel sensing of the unlicensed channel until the backoff counter N is zero. The decrementing of the backoff counter N is deferred by the defer duration 312, $T_d$, if a slot duration 310 or an additional slot duration 310' is found to be occupied.

The LBT procedure 300 comprises initializing the backoff counter N and performing the LBT operations until the backoff counter N is zero.

More specifically, by performing the example of the LBT procedure 300, the device 100 may control or adjust a backoff counter N based on sensing the unlicensed channel for one or more additional slot durations 310', $T_{sl}$, according to the steps below.

For an independent LBT procedure, in a step S1, the backoff counter N is initialized by setting $N=N_{init}$. The initial value $N_{init}$ is a random number uniformly distributed between 0 and $CW_p$. Then, the exemplary LBT procedure 300 continues at a step S4. In a step S2, if the backoff counter is N>0 and the device 100 (i.e., the UE or the access node, e.g., a gNB or eNB) chooses to decrement the backoff counter, set N=N−1.

In a step S3, the device 100 senses the channel for an additional slot duration 310', $T_{sl}$. If the additional slot duration 310' is idle, the LBT procedure 300 continues at the step S4. Else, the LBT procedure 300 continues at a step S5.

In the step S4, if N=0, the LBT procedure 300 stops indicating that the channel is idle for the transmission 206. Else, the LBT procedure 300 continues at the step S2.

In the step S5, the device 100 senses the unlicensed channel during the slot durations 310, $T_{sl}$, of an additional defer duration $T_d$.

In a step S6, if the channel is sensed to be idle during the slot durations of the additional defer duration $T_d$, the LBT procedure 300 continues at the step S2. Else, the LBT procedure 300 continues at the step 5.

If the device 100 (e.g., an eNB or gNB) has not finished the transmission 206 of the RA message 304 on the unlicensed channel (e.g., including the PDSCH or a channel on which LAA Scells transmissions are performed) after the step S4 in the above example of the LBT procedure 300, the device 100 (e.g., an eNB or gNB) may transmit the RA message 304 (e.g., including PDSCH on the channel) after sensing the channel to be idle at least in the slot durations 310 of an additional defer duration 312, $T_d$.

The defer duration 312, $T_d$, may consist of the first channel sensing duration 306 immediately followed by $m_p$ consecutive slot durations 310, i.e., the second channel sensing duration 308. The first channel sensing duration 306, $T_f$, may be in the range of $16 us \leq T_f \leq 16 us + T_s$. Each slot duration may be in the range of $9 us \leq T_{sl} \leq 9 us + T_s$. Herein, "us" refers to the absolute time unit of a microsecond (μs).

$T_f$ includes an idle slot duration $T_{sl}$ at start of $T_f$. A slot duration $T_{sl}$ is considered to be idle or clear, if the device 100 senses the channel during the slot duration, and the power detected by the device 100 for at least 4 us within the slot duration is less than the energy detection threshold $X_{Thresh}$. Otherwise, the slot duration $T_{sl}$ is considered to be busy or occupied.

The range $CW_{min,p} \leq CW_p \leq CW_{max,p}$ is the contention window.

$CW_{min,p}$ and $CW_{max,p}$ are chosen before the step S1 of the LBT procedure.

In the example of the LBT procedure 300 illustrated in FIG. 3, the LBT parameters are $m_p=2$ and $N_{init}=2$.

The parameters $m_p$, $CW_{min,p}$ and $CW_{max,p}$ of the LBT procedure 300 are based on a channel access priority class. The channel access priority class may be associated with at least one of the device 100 (e.g., the radio device), a service underlying or triggering the RA procedure, and user data to be received and/or transmitted once the RA has been completed.

Below table and the Table 15.1.1-1 in 3GPP Technical Specification (TS) 36.213, V15.1.0 provides examples for LBT configurations (e.g., parameters of the LBT procedure 300) depending on the channel access priority class, p.

| Channel Access Priority Class (p) | $m_p$ | $CW_{min,p}$ | $CW_{max,p}$ | $T_{mcot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Once the device 100 has occupied the unlicensed channel (e.g., once the eNB or gNB has occupied the channel on which the LAA Scell transmissions are performed), the device 100 shall not continuously transmit on for a period exceeding a maximum channel occupancy time 316, $T_{mcot,p}$, e.g., as also given in any of the above-mentioned tables.

The channel access priority class, p, is determined by a traffic priority class. The high traffic priority class corresponds to a small p, which means that a short LBT duration is applied.

For p=3 and p=4 (e.g. video traffic, web browsing or FTP), if the absence of any other technology sharing the carrier can be guaranteed on a long-term basis (e.g. by level of regulation), $T_{mcot,p}$=10 ms, otherwise, $T_{mcot,p}$=8 ms.

Exemplary RA configurations (e.g., parameters of the RA transmissions or RA procedure, particularly PRACH configurations or PRACH transmission parameters) are described and referenced below. Any of the RA configurations may be combined with any of the afore-mentioned LBT configurations (e.g., parameters of the LBT procedure). The RA configuration may specify at least one of formats for the RA preamble 304 (briefly: preamble formats) and the RA occasion.

The Tables 6.3.3.2-2 and 6.3.3.2-3 in the document 3GPP TS 38.211, version 15.3.0, on "Random access configurations for FR1 and paired spectrum/supplementary uplink" and "Random access configurations for FR1 and unpaired spectrum" provide definitions for the PRACH configurations for a cell with supplementary carrier and without supplementary carrier, respectively. For example, the RA preamble 304 can only be transmitted in the time resources, i.e., the RA occasion, given by a higher-layer parameter prach-ConfigurationIndex according these tables.

For each table, there are 256 entries, and each entry corresponding to one PRACH configuration. The RRC parameter prach-ConfigurationIndex is used as an entry for the device 100 (e.g., a UE and/or a cell) to determine the PRACH transmission parameters, e.g., at least one of PRACH preamble format, subframe number, start of OFDM symbol, number of PRACH occasions within a slot, and PRACH duration parameters, etc.

The PRACH configuration can be broadcasted in the RAN, e.g., within a cell of the RAN. A UE as an embodiment of the device 100 may obtain the PRACH configuration by monitoring the system information (SI) in the cell. In addition to the PRACH configuration, a UE 100 may receive other configuration via the SI or dedicated RRC signalling, based on which the UE 100 may determine other relevant parameters such as the periodicity of PRACH occasion occurrence, target received power of PRACH and maximum number of PRACH transmissions for one RA procedure, etc.

Hereinafter, various embodiments are described. Each of these embodiments is combinable with any of the aforementioned features, embodiments, examples and implementations. Furthermore, at least some of the various embodiments can enable a UE 100 to send a partial RA preamble 304 (i.e., a PRACH preamble) when the one or more channels for the PRACH transmission are determined to be available in the middle of a PRACH transmission occasion in the step 204.

While the below embodiments are described in the context of NR unlicensed spectrum (NR-U), the technique is not limited to NR-U scenarios. Any of the embodiments is also applicable to other unlicensed operation scenarios such as LTE-LAA and enhanced LAA (eLAA).

A first group of embodiments may relate to transmitting a partial RA message.

According to a first embodiment, the UE 100 starts LBT operation not only prior to a PRACH occasion as the first LBT operation according to the step 202 (i.e., at the boundary of a RA occasion), but also at any position within a PRACH occasion as the second LBT operation according to the step 204.

In one variant, the first and second LBT operations may be independent LBT procedures. In another variant, the UE 100 continues the LBT procedure for ordinary PRACH preamble transmission (i.e., the LBT procedure including the LBT operation 202), even if the intended one or more unlicensed channels for PRACH preamble transmission are not available (i.e., are occupied) at the start (i.e., at the beginning) of the PRACH preamble transmission occasion according to the step 202. Instead of ending the LBT procedure as a failure, the continued LBT procedure is used according to the step 204 to determine if a part of the OFDM symbols in the PRACH transmission occasion is available.

In any variant of the first embodiment, when the intended one or more unlicensed channels are determined to be free (i.e., idle) for just a part of the PRACH transmission occasion according to the step 204, the UE 100 transmits a partial PRACH preamble spanning the idle part, i.e., the remaining of the PRACH transmission occasion, as an example for the step 206.

For a partial PRACH preamble transmission in the step 206, the UE 100 preferably discards the PRACH preamble OFDM symbols that are mapped to the part of the RA occasion that is not free (i.e., the occupied part of the RA occasion at the beginning of the RA occasion). The UE 100 preferably transmits the PRACH preamble OFDM symbols that are mapped to available OFDM symbols of the PRACH transmission occasion (i.e., the idle part of the RA occasion).

Figure 4:
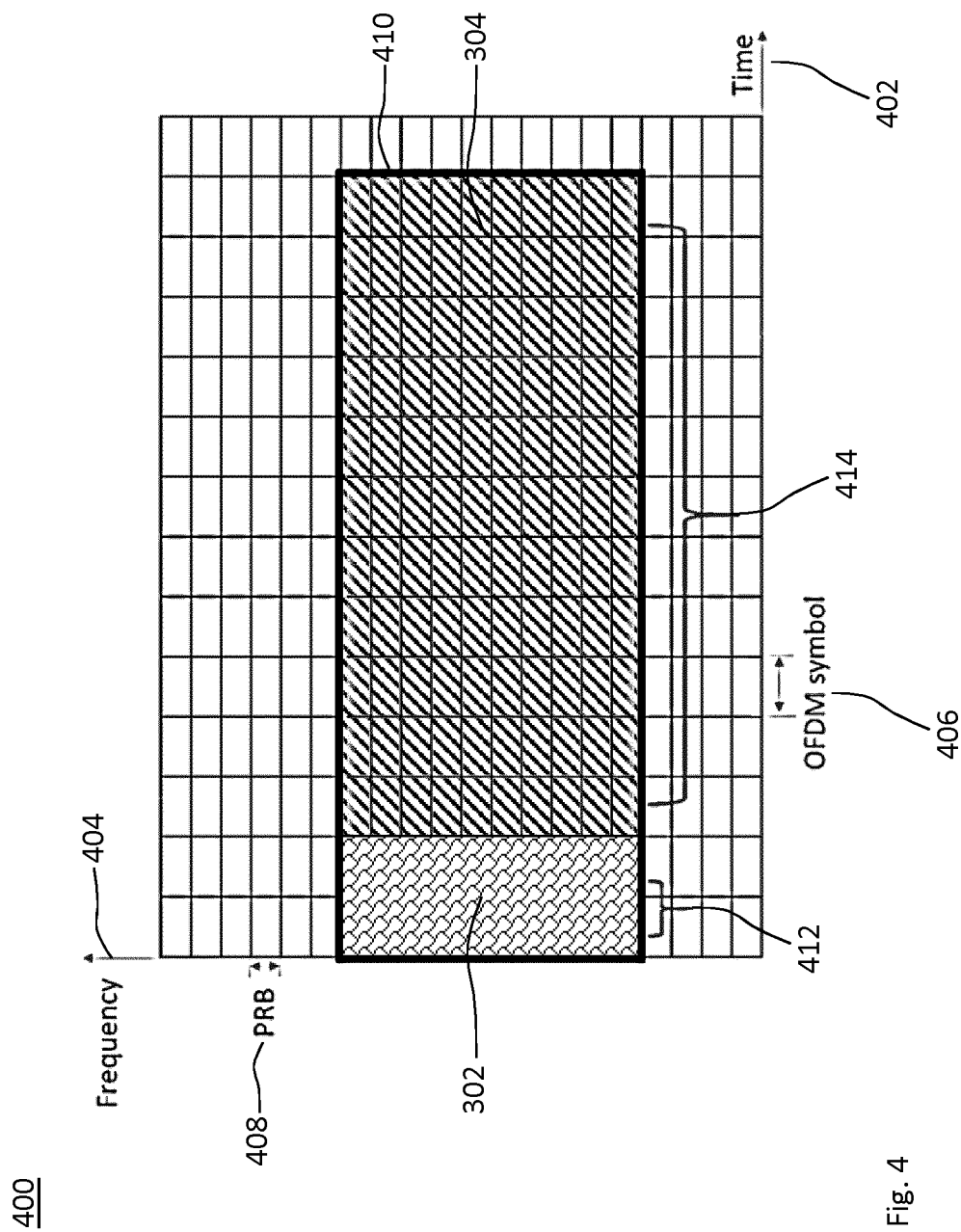
FIG. 4 schematically illustrates an exemplary random access procedure in the time domain, which is implementable in the device of FIG. 1 and the method of FIG. 2.

FIG. 4 schematically illustrates a time-frequency range (i.e., time-frequency resources) of an example of the unlicensed channel 400. Time 402 is horizontally drawn to the right. Frequency 404 is vertically drawn to the top. An exemplary scale is illustrated as a time-frequency grid with an OFDM symbol 406 as a unit for the time 402 and a physical resource block (PRB) 408 as a unit for the frequency 404. Each PRB 410 may encompass 12 subcarriers, i.e., 12 resource elements for per OFDM symbol 408.

The illustrated time-frequency range of the channel 400 includes an example of the RA resource 410. In the example illustrated in FIG. 4, the RA resource 410 is an RA occasion for the RA Msg1, i.e., the RA preamble 304.

The beginning 412 of the RA occasion 410 is occupied by a transmitter other than the device 100. The idle part 414 of the RA occasion 410 is used for the transmission 206 of the RA preamble 304, i.e., the partial RA preamble.

In the example illustrated in FIG. 4, a complete RA preamble (i.e., a whole PRACH preamble) comprises 13 OFDM symbols. Due to the first two OFDM symbols 412 of the PRACH transmission occasion 510 being not available (i.e., occupied), only the last 11 OFDM symbols 414 of the RA preamble 304 are transmitted.

According to a second embodiment, a threshold (e.g., an absolute time duration or a relative ratio of the time period) is configured to the UE 100. When the time duration for the one or more channels for the PRACH occasion 410 being available is greater than the configured threshold, the UE 100 transmits in the step 206 a partial RA preamble 304. Otherwise (i.e., if the duration is less than the threshold), the UE 100 may not transmit a partial PRACH preamble, i.e., the whole PRACH transmission occasion 410 is skipped. Alternatively or in addition, the threshold may also be configured in other forms such as a number of subframes, slots, OFDM symbols, milliseconds, microseconds, etc.

As a third embodiment, when there are multiple additional consecutive PRACH transmission occasions 410, the UE 100 may be configured to transmit a partial PRACH preamble 304 during the first RA occasion 410 according to the step 206. During the other additional RA occasions 410, the UE 100 may perform the ordinary PRACH preamble transmissions.

As a fourth embodiment, the UE 100 may still monitor an ordinary RAR window corresponding to the partial PRACH preamble transmission 206. This is very meaningful, since there is still a decent chance that the gNB is able to decode the partial PRACH preamble transmission 206. For reception of the RAR, the UE 100 may generate a RA radio network temporary identifier (RA-RNTI) assuming an ordinary (e.g., complete) RA preamble 304 would have been transmitted during the whole RA occasion 410 (i.e., the whole PRACH transmission occasion). In other words, the RA-RNTI generation assumes the whole PRACH preamble is transmitted within this whole PRACH transmission occasion 410.

As a fifth embodiment, the UE 100 may boost the transmission power for the transmission 206 of a partial RA preamble 304 to compensate the shortened PRACH transmission duration, e.g., so that the PRACH energy received by the gNB can be compensated. The power boost can be based on the configured threshold that is used to trigger the transmission 206 of the partial RA preamble 304. In other words, more power can be used for the transmission 206, if there are fewer OFDM symbols transmitted for the RA preamble 304. Optionally, another additional compensation offset (>=0 dB) may be added in order to conquer a loss in a (e.g., temporal) diversity gain and/or a loss in a signal processing gain at the receiver.

As a sixth embodiment, a UE capability indicator is defined (e.g., transmitted) to indicate (e.g., to a serving access node, e.g., gNB, optionally as an instance of the device 100) if the UE (as an instance of the device 100) supports the transmission 206 of a partial PRACH preamble 304. The function of transmitting the partial preamble 304 may be configured for a specific format of the PRACH preamble (preamble format). In other words, some PRACH preamble formats may support partial preamble transmission, while other formats are not allowed to do so.

As a seventh embodiment, a network (e.g., the RAN) may use system information (SI) or dedicated RRC signaling to configure the UE 100, e.g., to configure whether the transmission 206 of the partial RA preamble (e.g., a partial PRACH preamble) is allowed or not, and/or whether the transmission 206 of the partial RA preamble (e.g., a partial PRACH preamble) is allowed or not for each or certain of the PRACH preamble formats.

According to an eighth embodiment, if the RA procedure based on the transmission 206 of the partial RA preamble 304 fails, e.g., because the gNB does not provide an associated RAR message within the RAR window, the UE 100 may be preconfigured and/or it may be predefined that a transmission counter of the PRACH is increased or not. As an example, it can be preconfigured or predefined that the transmission counter of PRACH is still increased upon occurrence of a transmission failure for the transmission 206 of the partial RA preamble 304.

As a ninth embodiment, the UE 100 may be required to report measurement results on the one or more partial RA transmissions, e.g., after a successful radio link setup. For example, the measurement results may be indicative of a number of partial RA transmissions per time and/or per RA procedures. Alternatively or in addition, the measurement results may be indicative of a ratio between partial RA transmissions and complete RA transmissions. Based on collected information, i.e., receiving the reported measurement results at the gNB serving the UE 100, the gNB may determine (i.e., configure the UE 100) to enable or disable the partial RA transmission and/or to optimize the configuration of the partial RA transmission (e.g., to change the configuration of the UE 100).

As a tenth embodiment, upon a (e.g., intended) handover of the UE 100, the target gNB may comprise an indicator in the handover command (i.e., the RRC ReconfigurationWithSync) to inform the UE 100 if the partial PRACH transmission 206 is allowed (e.g., enabled or not).

As an eleventh embodiment, a set of candidate start positions within a PRACH preamble transmission occasion can be configured for a UE. The UE can only start partial PRACH preamble transmission from a selected start OFDM symbol. Only the PRACH preamble symbols that are mapped to OFDM symbols from the selected start OFDM symbol are transmitted.

As an independent method aspect and/or as a twelfth embodiment of the device 100 or an implementation of the method 200: A method of performing or providing random access (RA) to a radio access network (RAN) using a (e.g., licensed or unlicensed) channel is provided. The method aspect comprises or initiates a step of triggering an RA procedure (or receiving such a trigger) at or after a beginning of a RA resource for transmitting a RA message signal. The method aspect further comprises or initiates a step of performing an LBT operation on the channel, the LBT operation indicating the channel being idle within a part of the RA resource for transmitting the RA message signal. The method aspect further comprises or initiates a step of transmitting the RA message signal in response to the LBT operation. The independent method aspect may be combined with any feature or step disclosed for the method 200 and/or with any of the appended dependent claims, with or independent of the method of claim 1.

For example, the above independent method aspect or any of the embodiments may be extended for PRACH preamble transmission 206 in a licensed carrier when at least one of start OFDM symbols 412 of a PRACH transmission occasion 410 is passed but there are still some OFDM symbols 414 available upon the PRACH preamble 304 is encoded.

A second group of embodiments may relate to formats used for the transmission 206 of the complete or partial RA preamble 304. The second group of embodiments may overlap with the first group.

As a thirteenth embodiment, the UE 100 changes (or is configured by the RAN to change) its preamble format within the period of the RA occasion 410. For example, different preamble formats are associated with RA occasions with different time periods. The current RA occasion 410 is associated with another PRACH preamble format than the one used as a result of the change. More precisely, the UE 100 may change to a shorter PRACH preamble format within the period of the RA occasion 410 that is associated with a longer PRACH preamble format. In this case, a cell or a UE (each of which may embody the device 100) is allowed to support multiple PRACH preamble formats.

Any embodiment (e.g., any embodiment concerning signaling means, determination of the RN-RNTI and/or monitoring actions, or any one of the above-mentioned first to twelfth embodiments) may be combined and/or applicable with the UE 100 changing its preamble format, e.g., according to the thirteenth embodiment.

As a fourteenth embodiment, for any other RA message 304 in a RA procedure, e.g., Msg2, Msg3, Msg4, etc., the UE or the gNB (any one of which may embody the device 100) may transmit in the step 206 its RA message 304 within the idle part 414 of the RA resource (e.g., a RA transmission duration) responsive to the second LBT operation in the step 204. In this way, the RA message 304 is only part 414 of the assigned transmission duration 410 that is determined to be idle by means of the second LBT operation 204.

In any embodiment, the UE 100 or the gNB 100 may perform rate matching and/or puncturing for a protocol data unit (PDU) received from and/or built by a higher protocol layer, e.g., for a MAC PDU. The rate matching and/or puncturing may cause the received and/or built PDU to fit into the idle part 414, i.e., into an idle transmission duration 414 shortened relative to the original transmission duration 410.

As a fifteenth embodiment, for any RA message 304 (e.g., any other RA message 304) in a RA procedure, such as Msg2, Msg3, Msg4, etc., the UE 100 or the gNB 100 may be configured to change its subcarrier spacing (SCS) and/or its transmission duration 414. The change may depend on a (e.g., higher or increasing) channel occupancy and/or if LBT failures have occurred (e.g., as reported from the UE to the gNB). In this way, an original transmission of a RA message 304 may have a different SCS and/or a different transmission duration compared to its retransmissions.

A third group of embodiments may relate to an additional RA resource (e.g., an additional RA occasion) directly following the RA resource (e.g., the RA occasion) that is partly occupied according to the first LBT operation. The third group of embodiments may overlap with the first and/or the second group.

In any embodiment of the device 100 and in any implementation of the method 200, the gNB may configure the UE 100 (e.g., by means of dedicated signaling) and/or a cell covered by the gNB (e.g., by means of broadcasted SI) with additional RA occasions to be used by the UE 100 when the UE 100 is subject to the LBT failure.

As a sixteenth embodiment, additional PRACH occasions are configured. That is, configuration information transmitted by the gNB in the cell may specify the additional PRACH occasions. The additional PRACH occasions follow directly after the (e.g., regular) PRACH occasion, e.g., directly after the PRACH occasion after that is subject to the one or more LBT failures. The LBT failure may correspond to the first LBT operation indicating occupancy of the channel. The UE 100 may have two options for LBT operations. According to a first option, the UE 100 may perform the second LBT operation 204 aiming at occupying OFDM symbols during the RA occasion x (e.g., the previous PRACH occasion of the neighboring PRACH occasions) using that the UE 100 has detected an LBT failure. According to a second option, the UE 100 may perform the second LBT operation 204 (or a third LBT operation) aiming at occupying OFDM symbols at the beginning of the one or more additional RA occasions.

In order to (e.g., further) reduce the latency due to LBT subjection, the additional RA occasions may have different formats and/or different transmission periods associated with different PRACH preamble formats. In this way, the gNB can configure the UE 100 with multiple PRACH preamble formats, associated with RO occasions with different transmission durations. For a cell configured with additional RA occasions, the gNB may configure a cell with multiple prach-ConfigurationIndex, wherein one index is associated with a specific PRACH preamble format.

The additional RA occasion may be available for the transmission 206 of the UE 100 and/or any UE 100 in the cell based on at least one of the following triggers. A first trigger comprises the gNB configuring when the additional RA occasions are available by means of signaling. The signaling may be dedicated for the UE 100 or broadcasted in the cell. A second trigger comprises the UE 100 having experienced LBT failures for a number of consecutive RA occasions. For example, the additional RA occasion may be used for the transmission 206, if the number of consecutive RA occasions exceeds a predefined or configured threshold.

Figure 5:
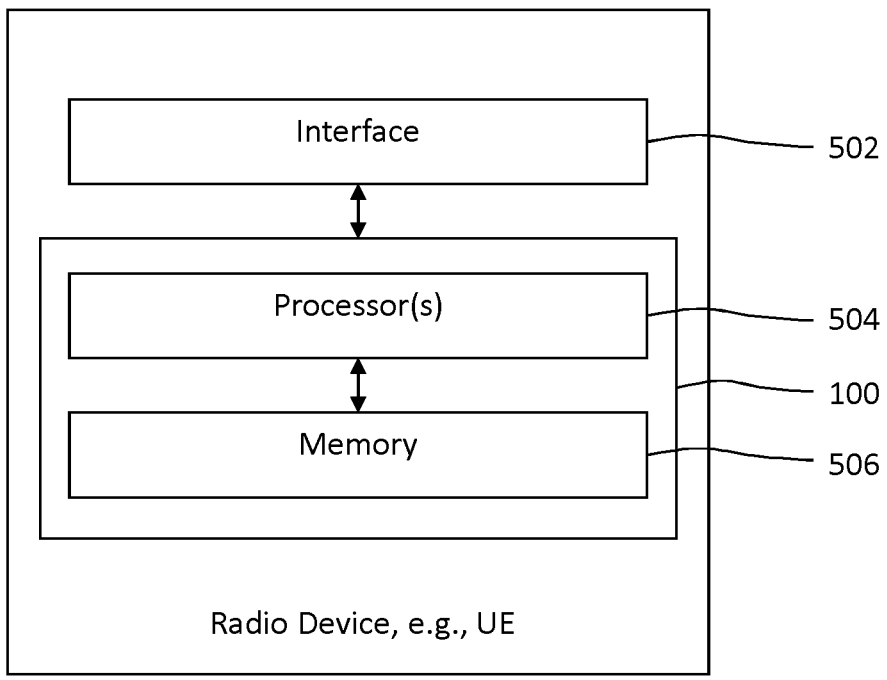
FIG. 5 shows a schematic block diagram of a radio device embodiment of the device of FIG. 1.

FIG. 5 shows a schematic block diagram for an embodiment of the device 100. The device 100 comprises one or more processors 504 for performing the method 200 and memory 506 coupled to the processors 504. For example, the memory 506 may be encoded with instructions that implement at least one of the modules 102, 104 and 106.

The one or more processors 504 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 506, radio device functionality and/or RA preamble transmitter functionality. For example, the one or more processors 504 may execute instructions stored in the memory 506. Such functionality may include providing various features and steps discussed herein, including any of the benefits disclosed herein. The expression "the device being operative to perform an action" may denote the device 100 being configured to perform the action.

As schematically illustrated in FIG. 5, the device 100 may be embodied by a radio device 500, e.g., functioning as a RA preamble transmitter, a data receiver and/or a data transmitter. The radio device 500 comprises a radio interface 502 coupled to the device 100 for radio communication with one or more radio devices and/or one or more access nodes (e.g., base stations).

Figure 6:
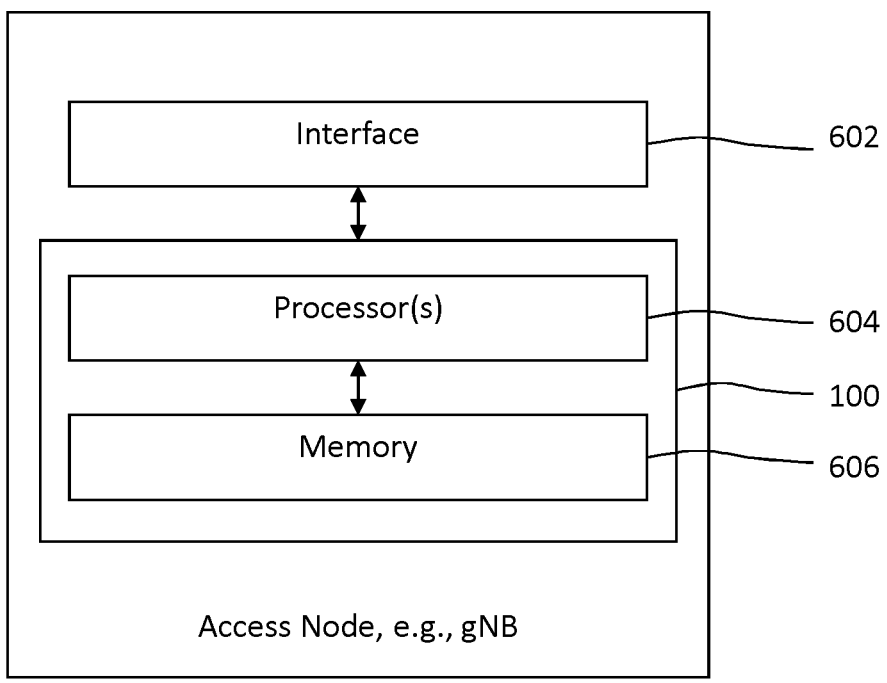
FIG. 6 shows a schematic block diagram of an access node embodiment of the device of FIG. 1.

FIG. 6 shows a schematic block diagram for an embodiment of the device 100. The device 100 comprises one or more processors 604 for performing the method 200 and memory 606 coupled to the processors 604. For example, the memory 606 may be encoded with instructions that implement at least one of the modules 102, 104 and 106.

The one or more processors 604 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 606, radio access functionality and/or RA preamble receiver functionality. For example, the one or more processors 604 may execute instructions stored in the memory 606. Such functionality may include providing various features and steps discussed herein, including any of the benefits disclosed herein. The expression "the device being operative to perform an action" may denote the device 100 being configured to perform the action.

As schematically illustrated in FIG. 6, the device 100 may be embodied by an access node 600, e.g., functioning as a RA preamble receiver, a data receiver and/or a data transmitter. The radio device 600 comprises a radio interface 602 coupled to the device 100 for radio communication with one or more radio devices and/or one or more access nodes (e.g., base stations).

Figure 7:
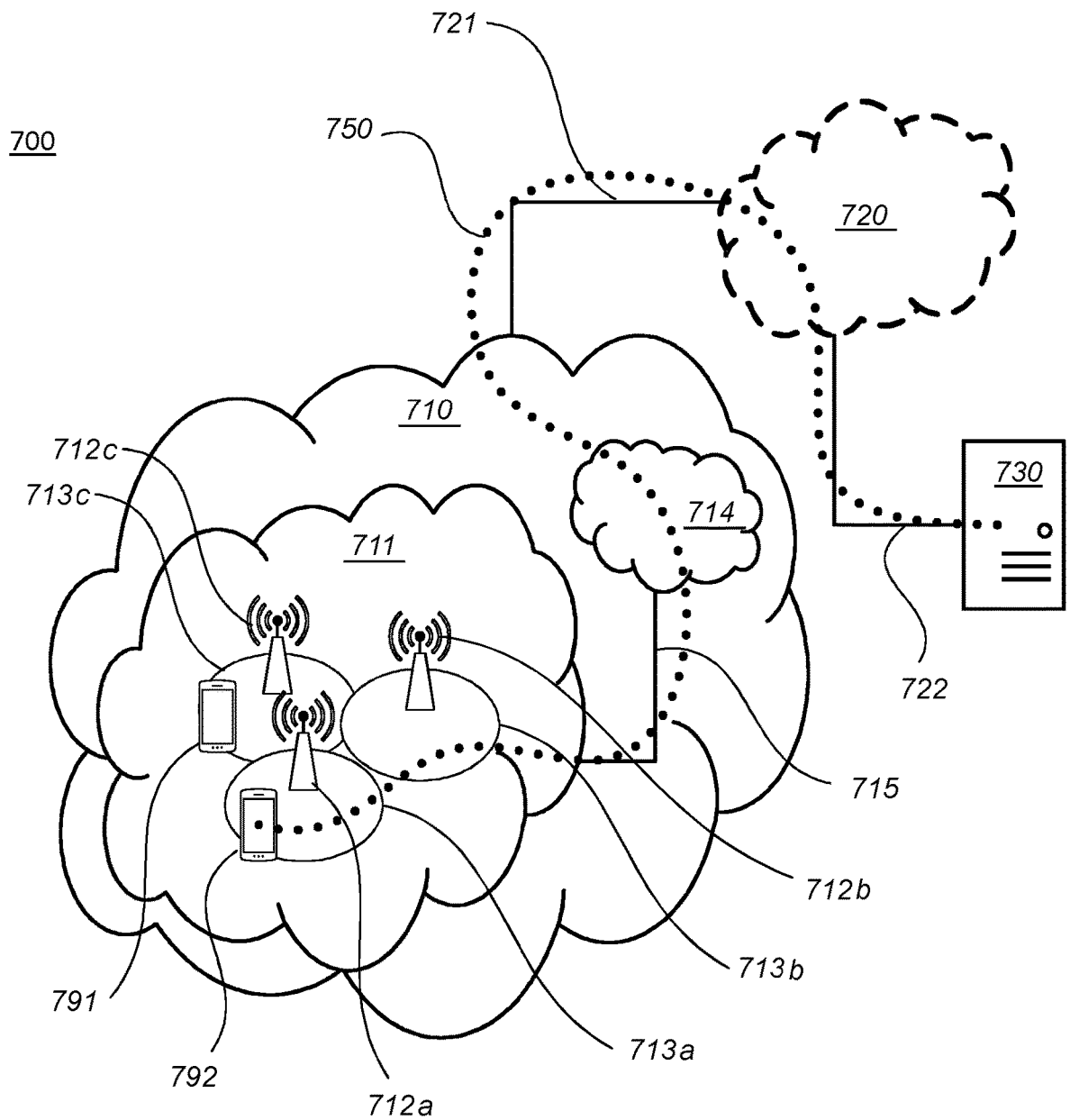
FIG. 7 schematically illustrates a telecommunication network connected via an intermediate network to a host computer.

With reference to FIG. 7, in accordance with an embodiment, a communication system 700 includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first user equipment (UE) 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a stand-alone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system 700 of FIG. 7 as a whole enables connectivity between one of the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected UE 791. Similarly, the base station 712 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data, which is transmitted using the OTT connection 850.

The host application 812 and/or the user data may define or influence the operation of the device 100 implemented by the base station 820 and/or the UE 830. For example, the channel access priority class, p, may depend on the host application 812 and/or the user data. Alternatively or in addition, the host computer 810 may directly or indirectly control the operation of the method 200, e.g., by directly or indirectly setting the channel access priority class, p. Furthermore, the method 200 may be performed selectively depending on at least one of the host computer 810, the host application 812 and the user data.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with a UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
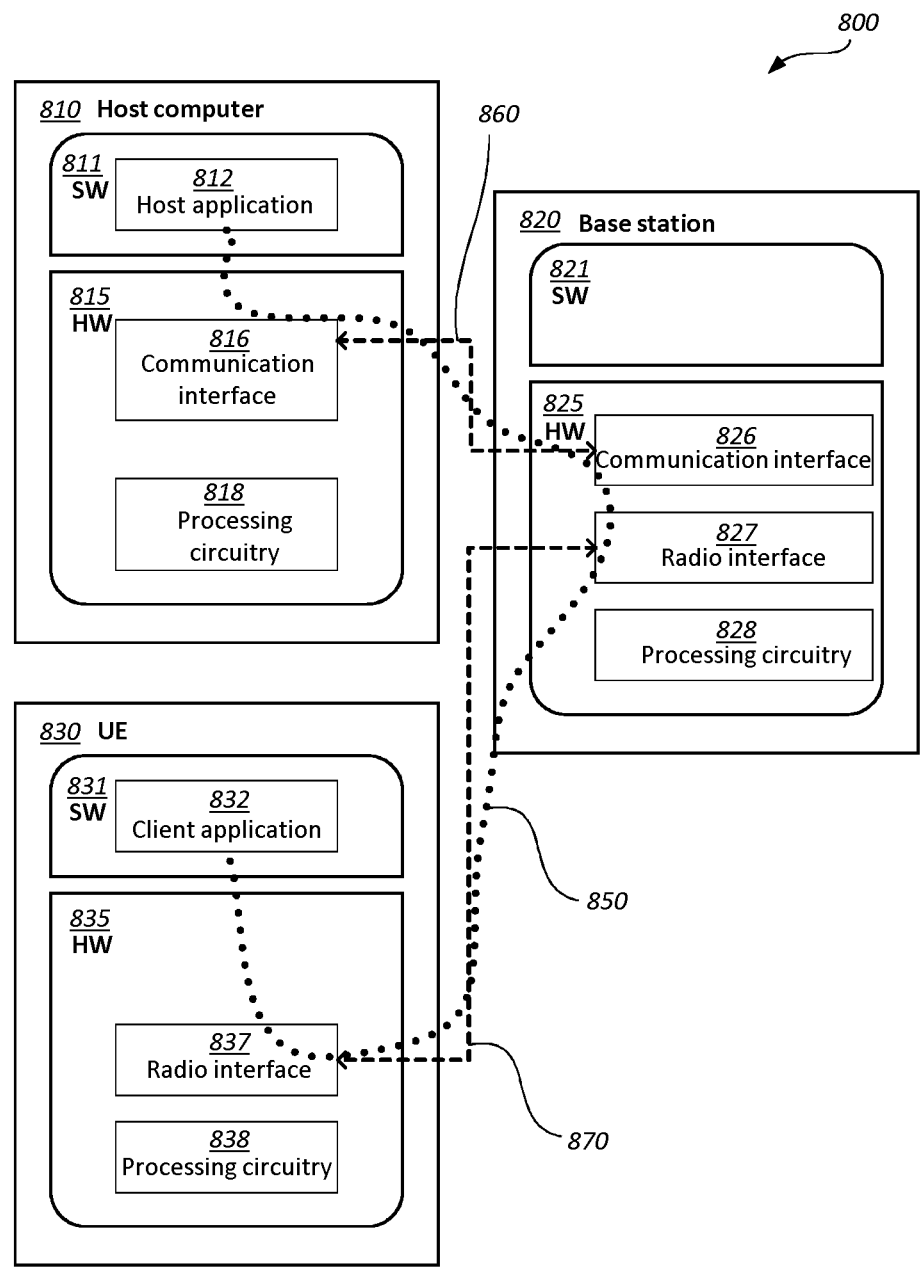
FIG. 8 shows a generalized block diagram of a host computer communicating via a base station with a user equipment over a partially wireless connection.

It is noted that the host computer 810, base station 820 and UE 830 illustrated in FIG. 8 may be identical to the host computer 730, one of the base stations 712a, 712b, 712c and one of the UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may reduce the latency and improve the data rate and thereby provide benefits such as better responsiveness.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or "dummy" messages, using the OTT connection 850 while it monitors propagation times, errors etc.

Figures 9, 10:
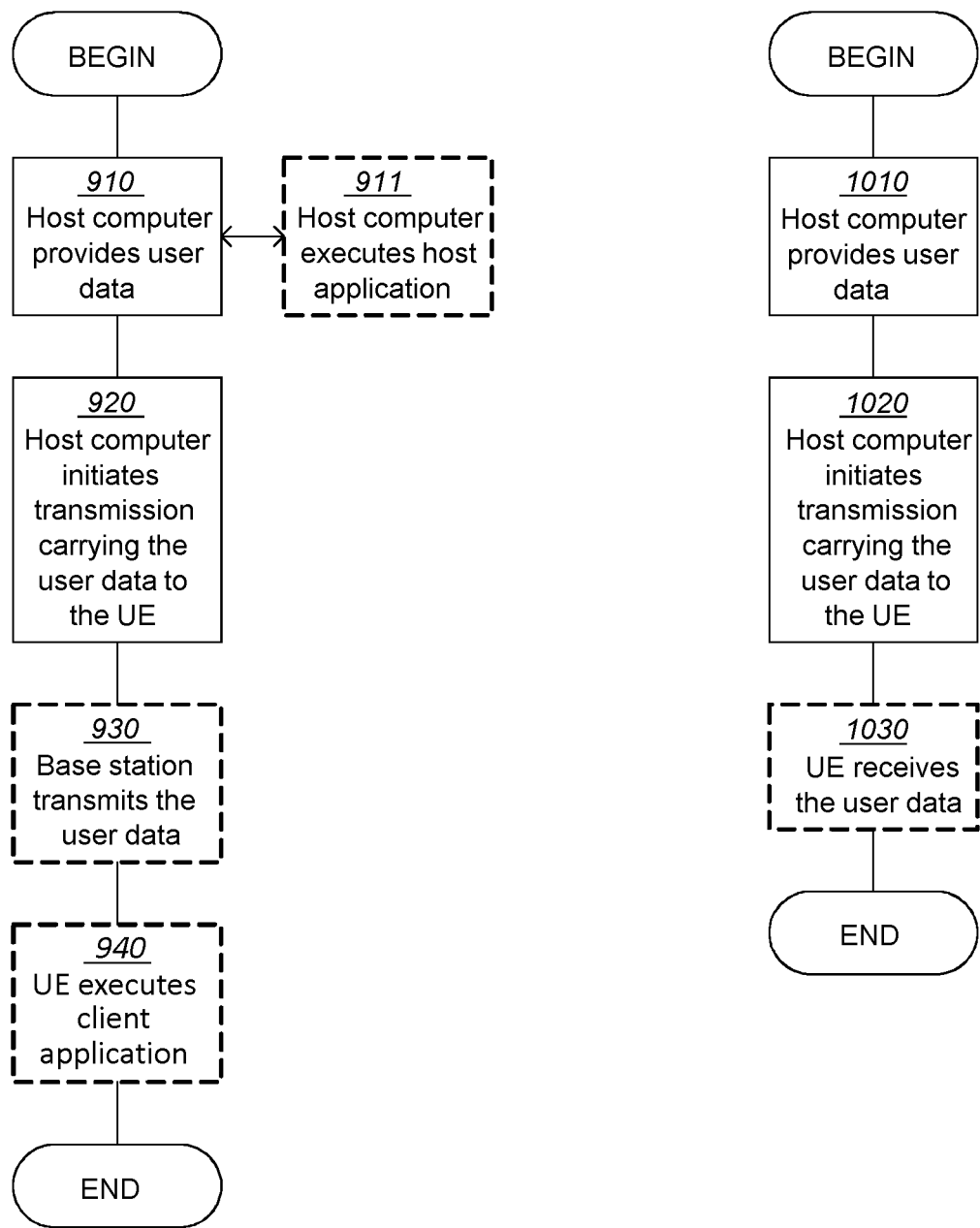
FIGS. 9 and 10 show flowcharts for methods implemented in a communication system including a host computer, a base station and a user equipment.

FIG. 9 is a flowchart illustrating a method implemented in a communication system, in accordance with one embodiment. The communication system includes a host computer, a base station and a UE, which may be those described with reference to FIGS. 7 and 8. For simplicity of the present disclosure, only drawing references to FIG. 9 will be included in this section. In a first step 910 of the method, the host computer provides user data. In an optional substep 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

FIG. 10 is a flowchart illustrating a method implemented in a communication system, in accordance with one embodiment. The communication system includes a host computer, a base station and a UE, which may be those described with reference to FIGS. 7 and 8. For simplicity of the present disclosure, only drawing references to FIG. 10 will be included in this section. In a first step 1010 of the method, the host computer provides user data. In an optional substep (not shown) the host computer provides the user data by executing a host application. In a second step 1020, the host computer initiates a transmission carrying the user data to the UE. The transmission may pass via the base station, in accordance with the teachings of the embodiments described throughout this disclosure. In an optional third step 1030, the UE receives the user data carried in the transmission.

As has become apparent from above description, embodiments of the technique can enhance a RA procedure, e.g., a PRACH transmission, in unlicensed spectrum, e.g., for NR-U. Same or further embodiments can reduce a delay caused by the RA procedure, e.g., for a PRACH transmission. Same or further embodiments can enhance the resource utilization efficiency for a RA procedure on unlicensed spectrum.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of performing or providing random access (RA) to a radio access network (RAN) using an unlicensed channel, the method comprising:
    initiating or performing a first listen-before-talk (LBT) operation on the unlicensed channel, the first LBT operation indicating the channel being occupied at a beginning of a RA occasion for transmitting a RA preamble signal;
    initiating or performing a second LBT operation on the unlicensed channel, the second LBT operation indicating the channel being idle within a part of the RA occasion for transmitting the RA preamble signal; and
    transmitting, or initiating the transmission of, the RA preamble signal in response to the second LBT operation, wherein the transmitted RA preamble signal comprises a partial RA preamble transmitted in the idle part of the RA occasion, wherein the RA preamble signal comprises orthogonal frequency division multiplexing (OFDM) symbols, and wherein the partial RA preamble comprises a subset of the OFDM symbols configured in the RAN for a complete RA preamble.

2. The method of claim 1, wherein the RA preamble signal is at least partly transmitted within the RA occasion.

3. The method of claim 1, wherein each of the OFDM symbols in the subset is temporally allocated in the RA occasion in accordance with an allocation of the respective OFDM symbol of the complete RA preamble.

4. The method of claim 1, further comprising:
monitoring, or initiating the monitoring of, an RA response window for reception of an RA response to the transmission of the partial RA preamble.

5. The method of claim 4, wherein the method is repeated in the absence of the RA response in the RA response window, a transmission power for the repeated transmission of the RA preamble signal being equal to a transmission power for the previous transmission of the RA preamble signal.

6. The method of claim 1, wherein the partial RA preamble is selectively transmitted in the idle part of the RA occasion, if a duration of the idle part of the RA occasion is greater than a threshold.

7. The method of claim 1, wherein a transmission power for the transmission of the partial RA preamble is inversely related to at least one of the threshold and the duration of the idle part of the RA occasion.

8. The method of claim 1, further comprising:
transmitting, or initiating the transmission of, a capability indicator indicative of support of the transmission of the partial RA preamble.

9. The method of claim 1, further comprising:
receiving, or initiating the receiving of, configuration information indicative of at least one of
(i) whether the RAN supports a reception of the partial RA preamble;
(ii) a value of the threshold;
(iii) one or more candidate start positions for the transmission of the partial RA preamble within the RA occasion; and
(iv) one or more formats of RA preambles to be used for the transmission of the partial RA preamble.

10. The method of claim 9, wherein the configuration information is at least one of received responsive to and dependent on the measurement report.

11. The method of claim 1, further comprising:
transmitting, or initiating the transmission of, a measurement report indicative of a number of transmissions of the partial RA preamble without reception of an associated RA response.

12. The method of claim 1, wherein a radio device configured for performing the RA to the RAN performs the method.

13. The method of claim 12, wherein the RAN comprises a plurality of access nodes including a source access node, which is currently serving the radio device, and a target access node for a handover of the radio device from the source access node to the target access node, the method further comprising:
receiving, or initiating the receiving of, a handover command indicative of whether the target access node supports a reception of the partial RA preamble.

14. The method of claim 1, wherein a first format for a complete RA preamble and a second format for a complete RA preamble are supported by the RAN, a duration of the complete RA preamble according to the second format being shorter than a duration of the complete RA preamble according to the first format.

15. The method of claim 14, wherein the transmission of the RA preamble signal within the RA occasion uses the second format in response to the second LBT operation.

16. The method of claim 14, wherein the second format is used in response to the second LBT operation, if at least one of:
a duration of the idle part of the RA occasion is shorter than the duration of the complete RA preamble according to the first format, or
a duration of the idle part of the RA occasion is equal or longer than the duration of the complete RA preamble according to the second format.

17. The method of claim 1, wherein an additional RA occasion is configured in the RAN directly after the RA occasion, the RA preamble signal being at least partly transmitted within the additional RA occasion.

18. The method of claim 17, further comprising:
initiating or performing a third LBT operation on the unlicensed channel, the third LBT operation indicating the channel being idle in the additional RA occasion.

19. The method of claim 17, wherein the RA preamble signal comprises a complete RA preamble transmitted in the additional RA occasion.

20. The method of claim 19, wherein the transmission of the complete RA preamble starts in the additional RA occasion.

21. A computer program product comprising a non-transitory computer readable medium storing program code for performing the method of claim 1.

22. A device for performing or providing random access (RA) to a radio access network (RAN) using an unlicensed channel, the device comprising:
memory; and
processing circuitry coupled to the memory, wherein the device is configured to:
perform a first listen-before-talk (LBT) operation on the unlicensed channel, the first LBT operation indicating the channel being occupied at a beginning of a RA occasion for transmitting a RA preamble signal;
perform a second LBT operation on the unlicensed channel, the second LBT operation indicating the channel being idle within a part of the RA occasion for transmitting the RA preamble signal; and
transmit the RA preamble signal in response to the second LBT operation, wherein the transmitted RA preamble signal comprises a partial RA preamble transmitted in the idle part of the RA occasion, wherein the RA preamble signal comprises orthogonal frequency division multiplexing (OFDM) symbols, and wherein the partial RA preamble comprises a subset of the OFDM symbols configured in the RAN for a complete RA preamble.

23. The device of claim 22, wherein the RA preamble signal is at least partly transmitted within the RA occasion.

* * * * *